Feb. 16, 1937. T. E. BOSWORTH 2,071,058
OPHTHALMIC MOUNTING "OXFORD"
Filed Feb. 6, 1934
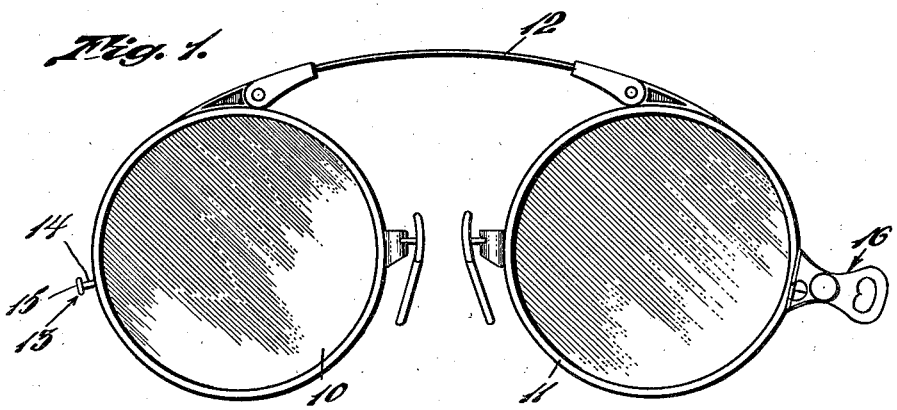
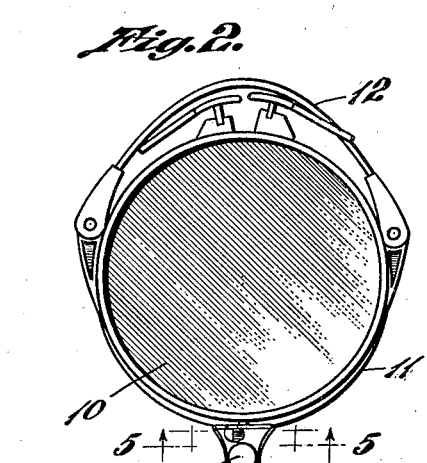
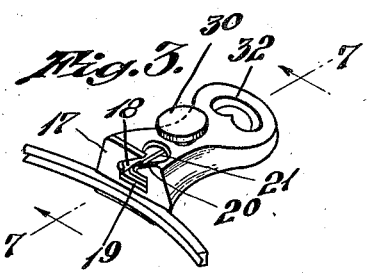
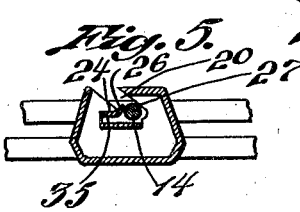
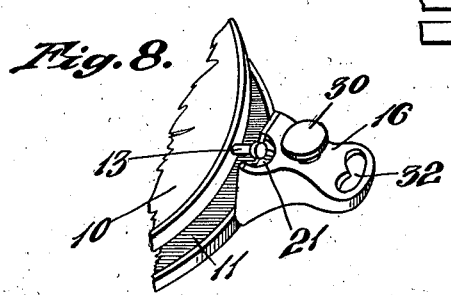
INVENTOR.
Thomas E. Bosworth
BY Barlow & Barlow
ATTORNEYS.

Patented Feb. 16, 1937

2,071,058

UNITED STATES PATENT OFFICE 2,071,058

OPHTHALMIC MOUNTING "OXFORD"

Thomas Edward Bosworth, Cranston, R. I., assignor to Universal Optical Corporation, Providence, R. I., a corporation of Rhode Island Application February 6, 1934, Serial No. 709,953

13 Claims. (Cl. 88—44)

This invention relates to an ophthalmic mounting of the "Oxford" type, wherein one lens will fold upon the other and be releasably secured in such folded position; and one of the objects of this invention is the provision of an arrangement whereby one of the lenses will be prevented from sliding in contact with the other lens which may cause a scratching of the lenses should any particles of foreign matter be present between them.

Another object of the invention is the provision of a catch which may be released by applying pressure thereon rather than requiring any sliding or laterally moving action of the parts to accomplish this result.

Another object of the invention is the provision of a construction such that the manner in which the same is operated will be perfectly obvious to one not familiar with mechanical structure.

Another object of the invention is the provision of a catch which will also be of sufficiently resilient material to provide such spring action as is necessary in the releasing of the catch from operating position.

A further object of the invention is the provision of a construction which will be so retained in its locked position that it will not jar loose and spring apart when being carried about by the user.

With these and other objects in view, the invention consists of certain novel features of construction, as will be more fully described, and particularly pointed out in the appended claims.

In the accompanying drawing:

Fig. 1 is an elevation looking at the rear side of an "Oxford" equipped with my improved catch.

Fig. 2 is an elevation looking at the rear side and showing the lenses in folded position.

Fig. 3 is a perspective view of the handle and latch portion secured to one of the lenses.

Fig. 4 is a perspective view of the resilient latch which is enclosed in the handle portion.

Fig. 5 is a sectional view on line 5—5 of Fig. 2.

Fig. 6 is a sectional view similar to Fig. 5 showing the catch as moved to its released position.

Fig. 7 is a sectional view on line 7—7 of Fig. 3.

Fig. 8 is a perspective view illustrating the catch as just emerging from or just entering the guide slot for movement from or to locked position.

In the use of "Oxfords", it is desirable to provide a handle having a catch which may be easily operated by one hand; also an arragement which may by its nature most clearly indicate to the operator the manner in which it is to be operated; and further a construction which will not permit scratching of the lenses in placing the parts in closed position; and in order that these desired results may be accomplished, I have provided a handle having an angular guide slot into which the catch must be positioned for moving it to secured or locked position. The angular relation of this guide slot is such that the lenses will not contact until they have reached substantially locked position whereby there will be no sliding of one lens surface over the other, and I have provided a button on the handle which by mere pressing and with but one hand may cause releasing of the catch to permit the lenses to be moved to open position by an action of the resilient bridge connecting them, as is usual in "Oxfords". This opening may be accomplished by merely pressing on the release button or by tightening one's grip upon the handle; and the following is a more detailed description of the present embodiment of this invention illustrating the preferred means by which these advantageous results may be accomplished.

With reference to the drawing, 10 designates the lenses which are mounted in rims 11 and connected together by a resilient bridge 12 which may be flexed from its position in Fig. 1 to its position in Fig. 2 in the folding of the lenses one upon the other and which while in this position exerts a force to swing the lenses to the position illustrated in Fig. 1.

In order that the lenses may be retained in their folded position, I have provided a catch 13 on one lens rim consisting of a shank portion 14 and a button head 15, while upon the other lens rim there is provided a handle designated generally 16 and consisting of a hollow tubular structure having an end plate 17 with an acute angular slot therein, designated generally 18 and having a portion 19 substantially parallel to the plane of the lenses, while the portion 20 is at an angle to the plane of the lenses.

The top wall of the handle is notched as at 21 to receive the head 15 of the catch 13 while the shank 14 of the catch engages the angular slot 20 to slide therealong and move inwardly when the lenses are to be in folded position; and in order that the catch may be retained in the slot in the handle, I have provided a spring latch designated generally 22 and consisting of a base portion 23 and an arm 24 notched as at 25 with a raised lip 26.

As the catch 14 moves inwardly it flexes the latch 22 and extends under the turned up edge 26 of the movable arm and when the catch is in the position illustrated in Fig. 5 with its arm 24 raised to engage the abutment portion 35 of the portion 19 of the slot, the distance between the edge 26 and the edge 27 of the portion 20 of the slot is less than the size of the shank 14 of the catch, thus this catch cannot be withdrawn from the slot while the arm 24 of this latch is in its raised position which it tends to assume by the inherent resilience of the folded portion 28 thereof. The notch 25 accommodates the head 15 of the catch and prevents the endways movement of the catch out of the slot 18.

A button or finger piece 30 may be secured to the arm 24 of the latch by threading it therein, the opening 33 being left for accommodation of the projecting end thereof, and by forcing the arm 24 inwardly from a position such as illustrated in Fig. 5 to the position illustrated in Fig. 6, the shank of the catch is forced downwardly into the lateral wider portion of the slot 18 and the arm 24 moves beneath the shank 14 of the catch so that the catch is now free to move outwardly in the angular portion 20 of the slot and be released and thus moved by reason of spring bridge 12 outwardly of the slot to swing the lenses to open position, as illustrated in Fig. 1. This finger piece also serves to maintain the spring in proper position in this handle.

The opening 32 in the handle may serve to suspend the device from a chain or the like as desired.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A folding eyeglass comprising a pair of lenses, a spring bridge connecting them and sufficiently resilient to permit of folding, a catch on one lens and a latch on the other lens for engaging said catch when in folded position to maintain said lenses in folded position, and guide means adjacent and above said latch and rigidly mounted with reference to one of said lenses and providing a surface at an acute angle to the plane of said lenses for directing said catch to and from said latch at an acute angle to the plane of said lens, whereby said lenses do not rub their surfaces one against the other.

2. A folding eyeglass comprising a pair of lenses, a spring bridge connecting them and sufficiently resilient to permit of folding, a catch on one lens and a latch on the other lens and movable with reference thereto for engaging said catch when in folded position to maintain said lenses in folded position, and guide means adjacent and above said latch and rigidly mounted with reference to one of said lenses and providing a surface at an acute angle to the plane of said lenses for directing said catch to and from said latch at an angle to the plane of said lens, said catch being rigid on the lens on which it is mounted and thereby directing the movement of said lens in said means.

3. A folding eyeglass comprising a pair of lenses, a spring bridge connecting them and sufficiently resilient to permit of folding, a catch on one lens and a socket on the other lens for receiving said catch and a latch on said socket for engaging said catch when the lenses are in folded position to maintain said lenses in folded position, said latch consisting of a member folded upon itself into substantially U-shape with one arm of the U extending over said catch when the lenses are held in folded position and being of an inherent resiliency to supply such spring action as is required.

4. A folding eyeglass comprising a pair of lenses, a spring bridge connecting them and sufficiently resilient to permit of folding, a catch on one lens and a socket on the other lens for receiving said catch and a latch in said socket for engaging said catch when the lenses are in folded position to maintain said lenses in folded position, said latch consisting of a member folded upon itself into substantially U-shape with one arm of the U extending over said catch when the lenses are held in folded position and being of an inherent resiliency to supply such spring action as is required, and a finger piece for moving the arms of said U member together for release of said catch.

5. A folding eyeglass comprising a pair of lenses, a spring bridge connecting them and sufficiently resilient to permit of folding, a catch on one lens and a latch on the other lens movable with reference thereto for engaging said catch when in folded position to maintain said lenses in folded position and guide means adjacent and above said latch and rigidly mounted with reference to one of said lenses and providing a surface at an acute angle to the plane of said lenses for initially directing said catch upwardly and away from the plane of the lens carrying said latch while the catch is at the same time swinging laterally in the plane of the lens by action of said spring bridge upon moving said latch to release position.

6. A folding eyeglass comprising a pair of lenses, a spring bridge connecting them and sufficiently resilient to permit folding, a catch on one lens, a handle on the other lens having a slot therein at an angle to the plane of the lenses and opening outwardly away from the plane of the lens in one portion of said slot to receive said catch in said portion of the slot, and resilient means in the other portion of the slot to releasably retain said catch in position in the slot.

7. A folding eyeglass comprising a pair of lenses, a spring bridge connecting them and sufficiently resilient to permit folding, a catch on one lens, a handle on the other lens having an acute angular slot therein at an angle to the plane of the lenses and opening outwardly away from the plane of the lens in one portion of said slot to receive said catch in said portion of the slot, and a U-shaped spring in the other portion of said slot to retain said catch in said slot.

8. A folding eyeglass comprising a pair of lenses, a spring bridge connecting them and sufficiently resilient to permit folding, a catch on one lens, a handle on the other lens having an acute angular slot therein to receive said catch, and a U-shaped spring in one portion of said slot having a pair of arms, one of which engages said catch to hold it in said slot.

9. A folding eyeglass comprising a pair of lenses, a spring bridge connecting them and sufficiently resilient to permit folding, a catch on one lens, a handle on the other lens having an acute angular slot therein to receive said catch, a U-shaped spring in one portion of said slot having a pair of arms, one of which engages said catch to hold it in said slot, and a finger piece to compress said arm which holds said catch for discharging the catch through said slot.

10. A folding eyeglass comprising a pair of lenses, a spring bridge connecting them and sufficiently resilient to permit folding, a catch on one lens, a handle on the other lens having an acute angular slot therein to receive said catch, a U-shaped spring in one portion of said slot having a pair of arms, one of which engages said catch to hold it in said slot, and a finger piece to compress said arm which holds said catch for discharging the same through said slot, said finger piece being mounted for movement at right angles to said arm.

11. A folding eyeglass comprising a pair of lenses, a spring bridge connecting them and sufficiently resilient to permit of folding, a catch on one lens and a latch on the other lens for engaging said catch when in folded position to maintain said lenses in such position, said latch arranged to be readily disengaged from said catch by a movement of the catch generally at right angles to the plane of the lenses, and guide means adjacent and above said latch and rigidly mounted with respect to one of said lenses and providing a surface at an angle to the plane of said lenses for directing said catch to and from said latch at an angle to the plane of said lens.

12. In a folding eyeglass having a pair of lenses, and a spring bridge connecting said lenses, a member rigidly mounted with reference to one of said lenses and having a slot therein a portion of which inclines away from the plane of the lenses and the inner portion of which connects with an opening having an edge which extends substantially parallel to such plane, a catch rigidly mounted with reference to the other of said lenses, a resilient latch member arranged to press against said parallel edge to hold the catch within the slot and to be moved generally transverse to the plane of the lens to permit the catch to pass.

13. A folding eyeglass comprising a pair of lenses, a spring bridge connecting them and sufficiently resilient to permit folding, a catch on one lens, a handle on the other lens having a slot therein opening outwardly away from the plane of the lens, the inner portion of said slot connecting with an opening adapted to receive said catch in said portion, and resilient latch means in said opening, said catch adapted to snap past said latch means into a position in the opening in which the latch locks the catch against accidental removal therefrom.

THOMAS EDWARD BOSWORTH.